United States Patent [19]

Boyadjieff

[11] Patent Number: 4,610,465
[45] Date of Patent: Sep. 9, 1986

[54] STRUCTURE AND USE OF REMOTELY RELEASABLE PILE CONNECTORS

[75] Inventor: George I. Boyadjieff, Anaheim, Calif.

[73] Assignee: Varco International, Inc., Orange, Calif.

[21] Appl. No.: 543,518

[22] Filed: Oct. 19, 1983

[51] Int. Cl.⁴ .............................................. F16L 35/00
[52] U.S. Cl. .......................................... 285/3; 285/18; 285/39; 285/91; 285/308; 285/321; 285/920; 29/428
[58] Field of Search ............... 285/39, 3, 4, 321, 308, 285/18, DIG. 21, 91, 397; 166/21 L; 29/428

[56] References Cited

U.S. PATENT DOCUMENTS

| | | | |
|---|---|---|---|
| 2,244,124 | 6/1941 | Shemeley | 285/39 |
| 2,553,985 | 5/1951 | Siralusa | 285/18 X |
| 2,877,732 | 3/1959 | Eaton | 285/321 X |
| 3,122,383 | 2/1964 | Hirsch | 285/397 |
| 3,273,915 | 9/1966 | Bishop et al. | 285/18 |
| 3,345,084 | 10/1967 | Hanes et al. | 285/39 X |
| 3,356,389 | 12/1967 | Fredd | 285/321 X |
| 3,521,911 | 7/1970 | Hanes et al. | 285/321 X |
| 4,451,056 | 5/1984 | Galle | 285/3 |
| 4,457,368 | 7/1984 | Knierimen | 285/3 X |

Primary Examiner—Dave W. Arola
Attorney, Agent, or Firm—William P. Green

[57] ABSTRACT

A rigid connection for joining together two successive sections of a string of piling or the like includes a tubular box member, a pin member having a portion which projects into the box member, a locking member operable to releasably hold the pin and box members against separation, and a retaining element for holding the locking member in its active locking position. The locking member may take the form of a split ring having an interruption within which the retaining element is receivable to hold the locking member in an expanded locking condition. The locking member is preferably initially actuated to its locking condition by fluid pressure actuated means.

28 Claims, 8 Drawing Figures

STRUCTURE AND USE OF REMOTELY RELEASABLE PILE CONNECTORS

BACKGROUND OF THE INVENTION

This invention relates to remotely releasable joints for interconnecting pile members or other tubular elements, and to methods of making and breaking such joints.

When piling is driven into an ocean floor to anchor a marine drilling platform to the floor, it is customary to ultimately remove some of the upper 'follower piles' from each string of piling after the driving operation has been completed. To enable such detachment of a follower pile from a permanent pile, connections have been devised which are intended to be rigid enough to withstand the forces encountered during driving of a string of piling into the earth, but which can be relatively easily released after the driving operation is completed to permit an upper portion of the string of piling to be retrieved. For use in situations in which the connection to be released is accessible at the surface of the water, or near the surface by a diver, the joint may be designed for disconnection by a wrench or other manually actuated tool. In some instances, however, a joint between a permanent pile and a follower pile may be just above the ocean floor and so deep as to render its direct access to a diver difficult if not impossible. For use in such situations, special connections have been proposed which can be located near the ocean floor but which can be released remotely from the surface of the water. For example U.S. Pat. No. 4,074,912 issued Feb. 21, 1978 to Bilderbeek et al. shows a connection which is adapted to be released remotely by lowering a releasing tool through a follower pile and to a location at which it can engage and withdraw upwardly a retaining sleeve within the connection. This sleeve holds a series of connecting fingers of the joint structure in a locked position until upward removal of the sleeve frees those fingers for radially inward movement in a manner enabling the upper portion of the string of piling to be withdrawn upwardly. It is our understanding that this type connection has not proven as satisfactory as would be desired in use, and is subject to possible unintentional release by displacement of the retaining sleeve during the pile driving or other handling operations. Another expedient which has been utilized is a 'breech block' type of connector, having interrupted thread like projections which are designed to enable the connection to be made or broken by rotation of one pile member relative to another. Such breech block connectors are shown for example in U.S. Pat. Nos. 3,421,580, 3,442,536, 3,800,869, 3,974,875, 4,165,891, 4,185,856 and 4,209,191. This type of remotely releasable connector has the disadvantage of requiring provision of equipment at the surface of the water which is capable of turning the upper portion of the string of piling, with resultant increase in cost and inconvenience of the pile handling process.

SUMMARY OF THE INVENTION

The present invention provides an improved releasable connection which can be utilized for joining together two pile members or other pipe sections requiring detachment, and which may be designed for release remotely, as for instance where a connection located deep within a body of water must be released by manipulation of equipment from the surface of the water as discussed above. Further, a joint embodying the invention does not have the disadvantage of requiring rotation of the upper follower piles in order to make or break a joint, and is more positive and reliably effective than other prior types of remotely releasable connections which have been intended for release without rotation.

A joint constructed in accordance with the invention includes a tubular box section, a pin section adapted to project telescopically into the box section, and a locking structure which is movable relative to the sections between an active locking position in which it is effective to retain the sections against axial separation and a released position permitting such separation. The locking structure preferably takes the form of a locking ring which may be carried by the pin section and be expansible radially outwardly against the box section to rigidly interconnect the two sections against separation. A retaining element may hold the locking structure in its active locking position, and be displaceable to a released position to break the connection. The retaining element is desirably located within an interruption in the locking ring to hold it in expanded condition.

The ring or other locking structure may be actuated to its locking condition by fluid pressure operated means, preferably taking the form of the plurality of piston and cylinder units carried by the pin section at the radially inner side of the locking structure to expand it outwardly. The joint may be released by lowering a releasing tool into the piling and to the location of the joint, with that tool acting to displace the retaining element radially outwardly to free the locking structure for return to a released condition.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
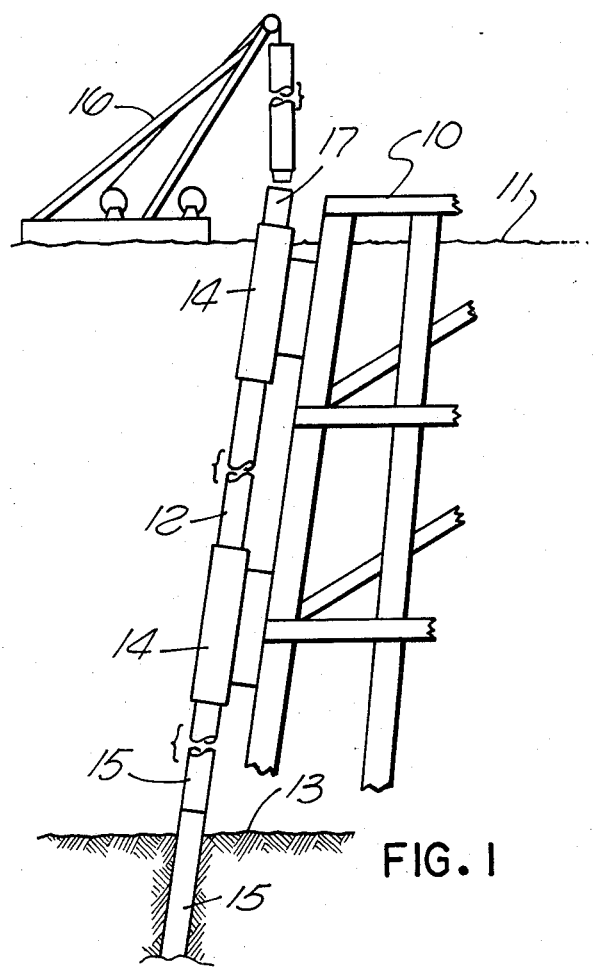
FIG. 1 is a diagrammatic representation of a marine drilling installation during connection of an added follower pile to the upper end of a string of piling.

In FIG. 1, there is represented diagrammatically at 10 a marine drilling platform which is being secured in a desired position within a body of water 11 by a number of lengths of piling 12 driven into the earth formation beneath the ocean floor 13. The piling extends downwardly through aligned tubular guides 14 secured to platform 10. The string of piling is formed of a number of individual pile members 15, one of which is represented in FIG. 1 as being lowered by hoisting mechanism 16 for connection of its lower end to the upper end 17 of the next successive section by a remotely releasable joint constructed in accordance with the present invention. This joint is represented at 18 in FIG. 3, and is illustrated in greater detail in FIGS. 4 through 8.

Figure 2:
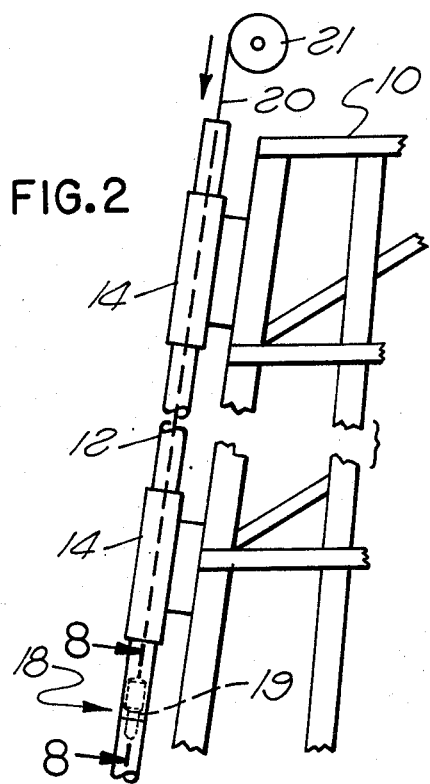
FIG. 2 is a similar diagrammatic representation of the marine drilling platform of FIG. 1 during the process of remotely releasing the connection between a follower pile and permanent pile.

After the remotely releasable connection embodying the invention has been made between the two upper sections of piling in FIG. 1, the string of piling is driven downwardly in conventional manner, to a position in which a next successive pile member can be connected to the upper end of the string, with this process being repeated until a desired predetermined penetration of the earth formation has been attained. In FIG. 2, it is assumed that the joint 18 formed in accordance with the invention has reached a location near the ocean floor, and that the follower piles above that location are to be detached from the permanent piles therebeneath by disconnection at the joint 18, utilizing a remote releasing tool 19 which is lowered into the string of piling on a wire line 20 lowered by a drum 21.

Figure 3:
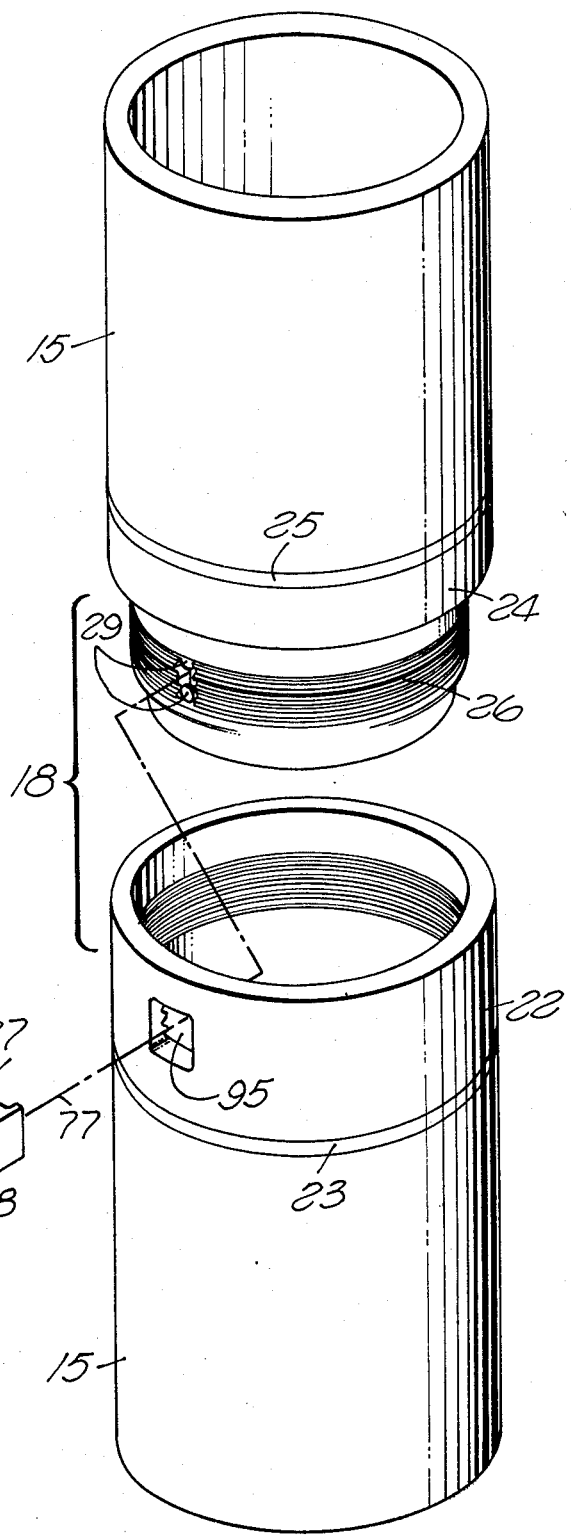
FIG. 3 is an exploded perspective view of the various elements of a remotely releasable connection utilized in the piling of FIGS. 1 and 2.

Referring now to FIG. 3, the remotely releasable joint 18 includes a tubular box section 22 which may be formed integrally with one of the pile members 15 or be formed separately and welded to an end thereof as represented at 23. A mating tubular pin section 24 may be formed integrally with the next upper pile member 15, or formed separately and welded thereto as represented at 25. The sections 22 and 24 are retained against axial separation by a locking ring 26, which can be held in its locking condition by a retaining element 27 attached to the pin section by a fastener 28. Retaining element 27 is a knockout part adapted to be displaced from its active holding position by two knockout pins 29 actuated by the remote releasing tool 19.

To simplify illustration and understanding of the connector parts, the various elements of the remotely releasable connection are illustrated in FIGS. 3 through 8 as centered about a vertical axis, though it will be understood that as represented in FIGS. 1 and 2 these parts are normally in use disposed at a slight batter angle to the true vertical. As seen best in FIGS. 2 and 8, the box section 22 of joint 18 may have an outer surface 30 which is cylindrical about the main longitudinal axis 31 of the string of pile members and may be flush with the outer surfaces 32 of pile elements 15 and surface 33 of the pin section. Internally, box section 22 has a tapering essentially conical surface 34 which engages or is in closely fitting slightly spaced relation to a correspondingly tapered surface 35 of pin section 24, with both of these surfaces being centered about axis 31. At a location intermediate its upper and lower ends, internal tapering surface 34 of the box section is interrupted by a series of annular teeth 36 centered about axis 31 and having the axial sectional configuration illustrated in the figures, with the innermost crest surfaces 37 of the teeth being aligned with and tapering and correspondence with conical surface 34, and with the teeth having abruptly inclined upper surfaces 38 and less abruptly inclined undersurfaces 39.

At a location radially opposite and inwardly of teeth 36, the pin section 24 of the joint contains an annular radially outwardly facing recess or groove 40 defined by a cylindrical radially inner surface 41 centered about axis 31 and two planar upper and lower surfaces 42 and 43 extending perpendicular to axis 31. The locking ring 26 is confined movably within recess 40 in a manner enabling the ring to be expanded radially outwardly with respect to axis 31 and contract radially inwardly, but with the ring being confined against axial movement. For this purpose, the ring has upper and lower planar transverse surfaces 44 and 45 which slidably engage surfaces 42 and 43 of the recess in a manner preventing axial movement of the ring but with sufficient looseness to enable the desired expansion and contraction of the ring. At its inner side, the ring has a cylindrical surface 46 centered about axis 31 and which is engageable with surface 41 of the pin section in the minimum diameter constricted position of the ring represented in FIG. 8 and in broken lines in FIGS. 4 and 7. The ring is formed of spring steel or other resilient material, and normally tends to return by its own resilience to the reduced diameter condition of FIG. 8. In that condition, the ring has an interruption or gap 47 (FIG. 5) between its opposite end surfaces 48 and 49 which may be planar and approximately parallel to one another and disposed essentially radially with respect to the axis 31 of the connection. Preferably, surfaces 48 and 49 extend directly parallel to one another and directly parallel to and equidistant from a plane 50 containing axis 31 in the FIG. 4 fully made-up condition of the joint.

At its radially outer side, ring 26 has a series of annular teeth 51, which are centered about axis 31 and have an axial sectional configuration corresponding essentially to teeth 36 of the box section, and which taper in correspondence therewith, so that the upper surfaces 52 of the ring can engage undersurfaces 39 of the teeth of the box section in a relation tending to cam the pin section 24 downwardly relative to box section 22 when the ring is forced radially outwardly relative to the pin section. This camming action forces a transverse annular stop shoulder 53 of the pin section against a correspondingly transverse annular upper end surface 54 of the box section, to form a very rigid connection between the two sections capable of withstanding the axial driving and rebounding forces to which the joints may be subjected as the string of piling is driven into the earth formation. The radially outer crest surfaces 55 of teeth 51 of ring 26 are at a diameter enabling them to move radially inwardly to or inwardly beyond positions of alignment with the tapering outer surface 35 of the pin section in the reduced diameter constricted position of the ring (FIG. 8) so that in that constricted position the teeth of the ring do not interfit with the teeth of the box section and do not block upward removal of the pin section from the box section.

Figure 4:
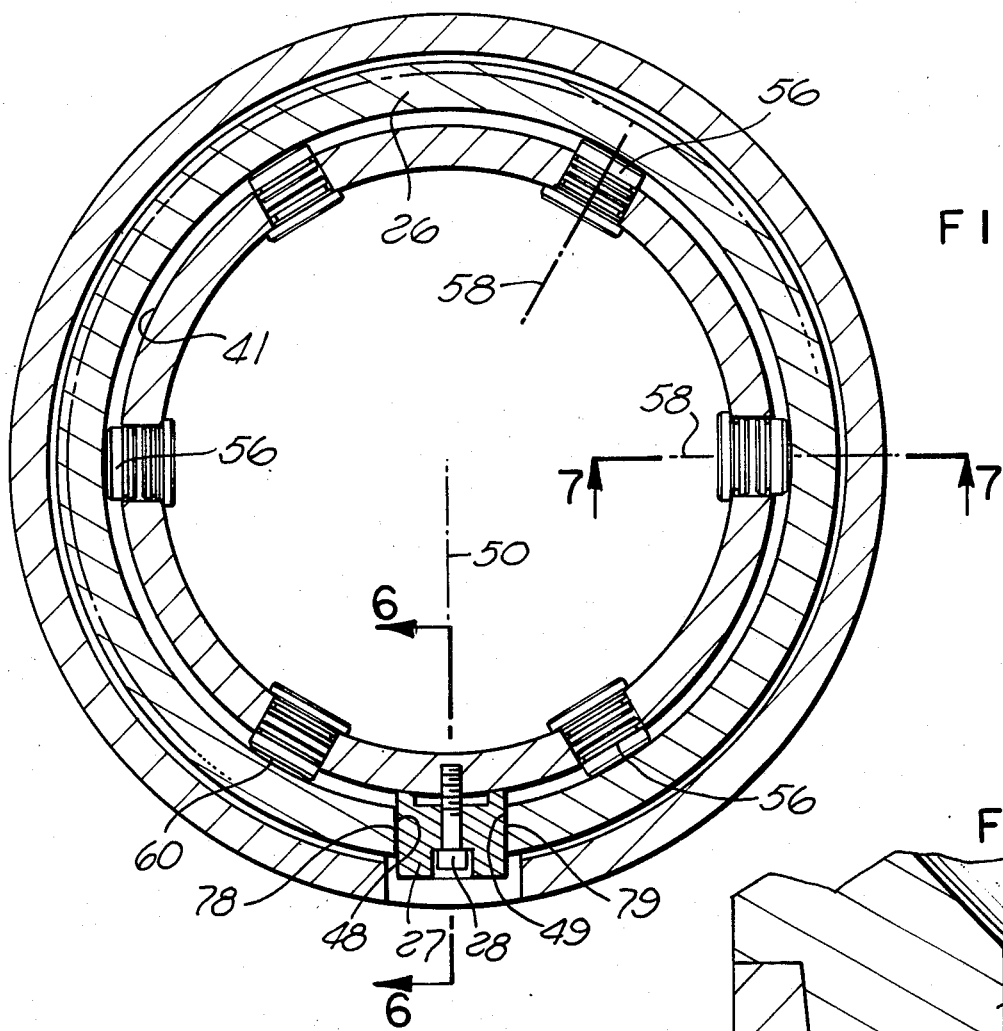
FIG. 4 is a transverse or horizontal section through a made-up connection embodying the invention.
Figure 6:
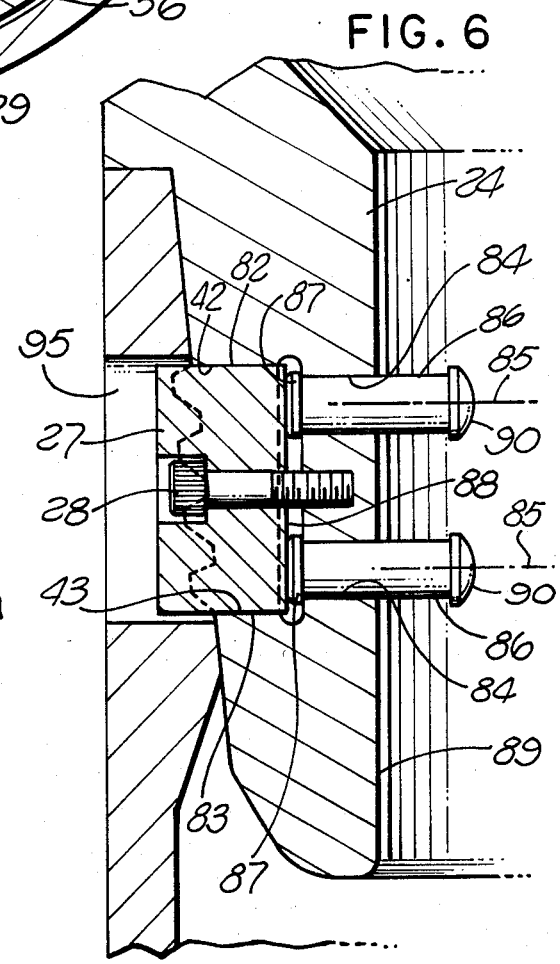
FIGS. 6 and 7 are vertical sections taken on lines 6—6 and 7—7 respectively of FIG. 4.
Figure 7:
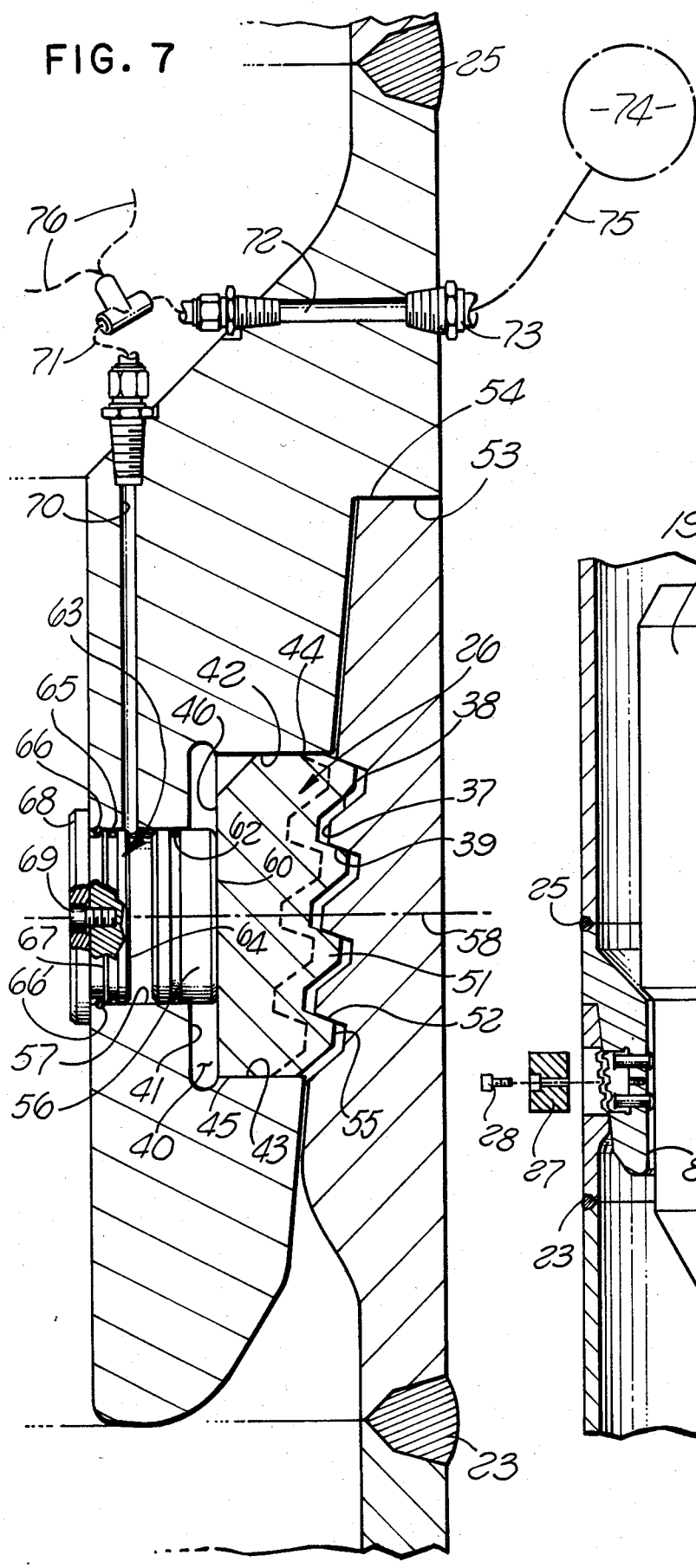

The ring is expanded to its active locking condition of FIGS. 4 and 7 by a series of circularly spaced pistons 56 mounted movably within individual cylindrical bores 57 formed in pin section 24 and centered about a series of individual circularly spaced axes 58 extending perpendicular to main axis 31 and intersecting that axis at a common location. Each piston may have an outer surface 60 engaging surface 46 of ring 26 to urge the ring radially outwardly. The peripheral surface 61 of the piston may extend cylindrically about the corresponding axis 58, with an elastomeric O-ring 62 received within a groove in the piston and forming a seal with respect to bore 57.

The inner end of each cylinder bore 57 may be closed by a circular plug or cylinder head element 63, having a circular portion 64 projecting into bore 57 and sealed with respect to the bore by an annular elastomeric O-ring 65, with a metal retaining ring 66 securing portion 64 against movement radially inwardly toward axis 31 beyond the position represented in FIG. 7. For this purpose, ring 66 may be received within an annular groove 66' formed in pin section 24, and may abut against an annular shoulder 67 formed on portion 64 of lug 63. The circular large diameter flange 68 of plug 63 may be formed separately from portion 64 and be secured thereto only after insertion of portion 64 into bore 57, with the connection between these parts being formed by one or more screws or other fasteners 69. In assembling the plug 63 within its corresponding bore 57, the split ring 66 may first be placed within groove 66', before either of the elements 64 or 68 of the plug has been moved into position, after which the element 64 can be inserted radially inwardly (leftwardly in FIG. 7) into the outer end of bore 57 and to a position in which its shoulder 67 engages ring 66 to retain element 64 against further leftward movement, following which flange 68 is attached to element 64 by screw 69 to complete formation of the closure at the inner end of the bore.

Fluid under pressure is supplied to each of the bores 57 at a location between the corresponding piston 56 and plug 63 through a passage 70 formed in the body of pin section 24 (FIG. 7), with the pressure fluid being supplied to the upper end of that passage as viewed in FIG. 7 through a tube 71 (shown schematically) connected to a radially extending passage 72 leading from a pressure port 73 to which pressurized fluid is supplied from a source represented at 74 through a line 75 detachably connectible to port 73. A single such pressure port may supply pressure fluid to all of the pistons by provision of interconnecting conduits 76 at the inside of the pin section connecting the single passage 72 with all of the various passages 70 leading to the different cylinder chambers. The pressure source 74 may typically be a hand pump capable of supplying air or liquid to the cylinders under a relatively high pressure, say for example 2,000 p.s.i., great enough to adequately preload the joint for proper rigidity and functioning under the driving forces.

Figure 5:
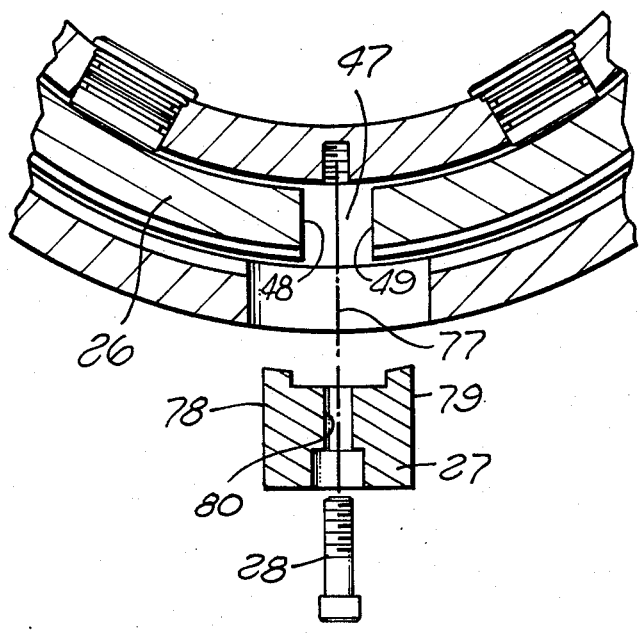
FIG. 5 is a view corresponding to a portion of FIG. 4, but showing the locking member and retaining member before they have been moved to their locking condition.

As the ring 26 is expanded radially outwardly to the active locking condition of FIGS. 4 and 7, the gap 47 between opposite end surfaces 48 and 49 of the ring gradually widens from the FIG. 5 condition to the condition represented in FIG. 4. The ring is held in that locking condition by insertion of the retaining element or block 27 radially inwardly through an opening 95 in the side wall of box section 22 and along an axis 77 which is perpendicular to and intersects main axis 31 of the joint, to the FIG. 4 position of reception circularly between the opposite end surfaces 48 and 49 of the ring. The width of the ring between its parallel planar opposite side surfaces 78 and 79 is exactly the same as the spacing between end surfaces 48 and 49 of the ring in the fully expanded prestressed locking condition of the ring (FIG. 7), so that the block can be inserted into the gap between the ring surfaces but is a very close fit therein to retain the ring against constriction after the block has been moved into its holding position. The block is secured in that position by fastener 28, which extends through a passage 80 in the block and connects threadedly to the pin section at 81. As will appear, the screw functions as a frangible or shear element, which holds the retaining block against the pin section effectively during the pile driving operation, but which can be broken by lowering of remote releasing tool 19 into the joint. The upper and lower surfaces 82 and 83 of the block may be parallel to one another and disposed directly transversely of axis 31 of the joint, and engage the previously mentioned upper and lower surfaces 42 and 43 of recess 40 within which the ring and block are received.

Radially inwardly of the retaining block 27, the annular side wall of pin section 24 contains two cylindrical bores 84 centered about axes 85 which are parallel to one another and intersect main axis 31, with two correspondingly cylindrical knockout pins 86 being received within bores 84 and guided thereby for movement radially of axis 31. At their radially outer ends, pins 86 may have slightly enlarged diameter heads 87 which are engageable with a planar inner surface 88 of block 27, so that when the block is in its active position of FIG. 6, the pins are held by the block in their inwardly displaced positions of that figure in which inner portions of the pins project inwardly beyond the cylindrical inner surface 89 of section 24. At their inner extremities, the pins may have slightly rounded somewhat enlarged diameter portions 90 to be engaged and deflected by remote releasing tool 19.

Tool 19 is an element typically formed of metal and having substantial weight to effect its intended joint breaking function, and may have a lower frustroconically tapered end portion 91 centered about axis 31 to facilitate stabbing of tools 19 into and through various joints of the string of piling as the tool is lowered thereinto. Above the tapered lower portion 91, tool 20 may have an outer cylindrical surface 92 centered about axis 31 and of a diameter just slightly less than the internal diameter of surface 89 of pin section 24 of joint 18, to be receivable within that cylindrical surface in the position illustrated in FIG. 8. At the upper end of surface 92, the tool body 20 may have an annular tapering shoulder 93 engageable downwardly against a tapering annular surface 94 of section 24 to prevent movement of the tool downwardly beyond the position of FIG. 8.

To now describe a cycle of use of the remotely releasable connection 18 illustrated in the figures, assume that a series of permanent piles are first interconnected by welding or other means and driven downwardly through guides such as those represented at 14 in FIG. 1 and into the earth formation. The upper end of the uppermost one of these permanent pile members is connected at the upper end of platform 10 and at essentially the surface of the body of water 11 to a follower pile by a connection embodying the present invention and corresponding to that identified by the number 18 in the drawings. This connection is made by lowering the follower pile as represented in FIG. 1 to a position in which its lower pin section 24 moves downwardly into the upper box section of the series of permanent piles, with the add-on piles being aligned with the permanent pile members and lowered until shoulders 53 and 54 of the pin and box sections are in annular engagement with one another. The locking ring or structure 26 is then expanded radially outwardly by injection of pressure fluid into pressure port 73 from a hand pump or other source, causing the pressure fluid to flow through passages 70 to the various cylinder bores 57 and force pistons 56 outwardly against ring 26, thereby expanding the ring from the broken line position of FIGS. 4 and 7 to the full line position of these figures. The engagement of teeth 36 and 51 pulls the pin and box section very tightly together to a preferably prestressed condition, widening the gap between end surfaces 48 and 49 of the ring to the condition represented in FIG. 4, in which retaining block 27 can be inserted radially inwardly into that gap and retained therein by screw 28. The fluid pressure can then be released, after which the string of piling can be driven further downwardly from the position in which joint 18 was made up at the surface of the body of water to the position of FIG. 2 in which joint 18 is just above the ocean floor 13.

Figure 8:
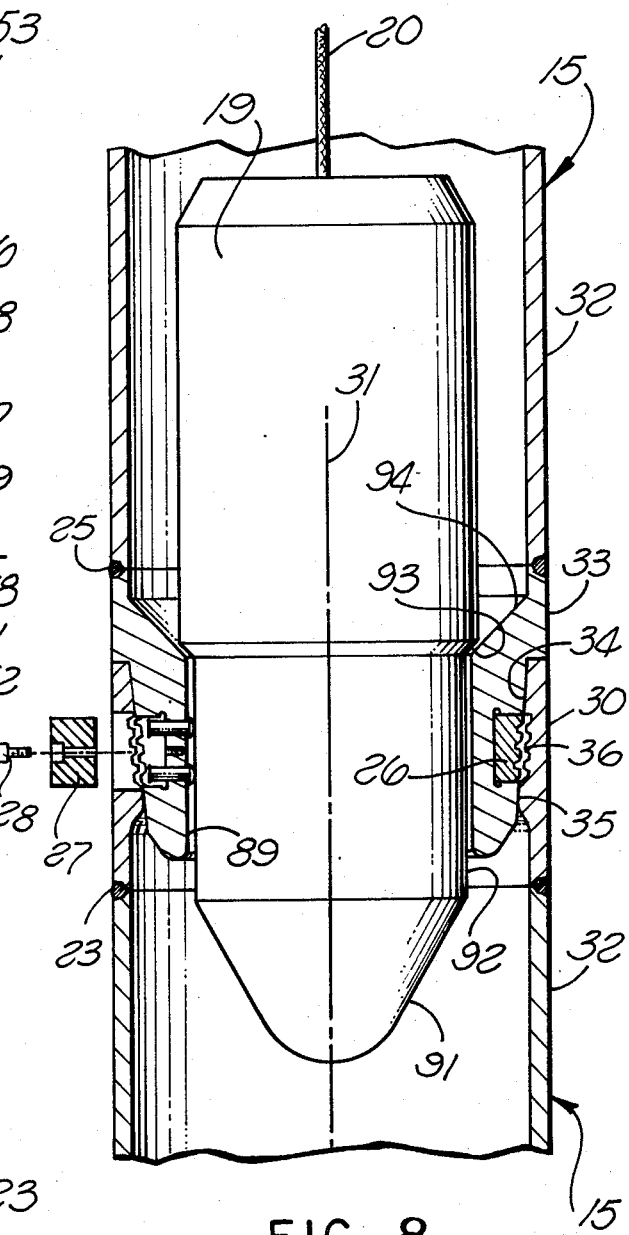
FIG. 8 shows the joint as the connection between its pin section and box section is being broken by a remotely actuated releasing tool.

After the joint 18 reaches the location of FIG. 2, remote releasing tool 19 can be lowered into the string of piling on line 20, and to a position in which tool 19 enters the pin section 24 and moves downwardly to the location of FIG. 8. The tapering annular lower end surface 91 of tool 19 engages pins 29 and cams them radially outwardly with respect to axis 31 and from the position of FIG. 6 to the position of FIG. 8, in a manner forcing the knockout block 27 radially outwardly from its FIG. 6 position through opening 95 in the side of box section 22 and to the exterior of the joint. Fastener 28 is intentionally formed to have insufficient strength to withstand the radially outward force which is exerted by pins 29 and block 27 when the relatively heavy releasing tool body 19 moves downwardly into pin section 24. That force breaks the connection between block 27 and pin section 24, either by pulling the screw axially apart or stripping its threads. The retaining block 27 and a portion of the screw may then fall downwardly at the outside of the permanent pile. As soon as the knockout block 27 has been ejected in this manner, the resilience of ring 26 automatically constricts that ring to its reduced diameter condition of FIGS. 3 and 5, in which gap 47 may be just slightly wider than the knockout pins 29 which are received therein. Constriction of the ring of course moves teeth 51 of the ring out of engagement with coacting teeth 36 of the box section, breaking the connection between the pin and box sections and enabling the pin section and the connected follower pile or piles thereabove to be retrieved upwardly through guides 14 for reuse in another installation.

While a certain specific embodiment of the present invention has been disclosed as typical, the invention is of course not limited to this particular form, but rather is applicable broadly to all such variations as fall within the scope of the appended claims.

I claim:

1. A joint comprising:
   a tubular box section;
   a pin section adapted to project into said box section;
   a locking structure which is generally annular but has an interruption and is adapted to be expanded from a reduced diameter condition to an increased diameter condition;
   said sections having means coacting with said locking structure to block relative movement of the sections axially apart in said increased diameter condition of the locking structure while permitting axial separation of the sections in said reduced diameter condition of the locking structure;
   a retaining member which is receivable in a locking position within said interruption in a relation holding said locking structure in said increased diameter condition, and is displaceable from said locking position to enable constriction of the structure to said reduced diameter condition and thereby permit separation of the sections; and
   means operable by pressure fluid to expand said locking structure from said reduced diameter condition to said increased diameter condition.

2. A joint as recited in claim 1, in which said last mentioned means include a plurality of piston and cylinder mechanisms carried by said pin section radially inwardly of said generally annular locking structure and at circularly spaced locations and adapted to apply radially outward force to said locking structure expanding it from said reduced diameter condition to said increased diameter condition.

3. A joint comprising:
   a tubular box section;
   a pin section adapted to project into said box section;
   a locking structure which is generally annular but has an interrption and is adapted to be expanded from a reduced diameter condition to an increased diameter condition;
   said sections having means coacting with said locking structure to block relative movement of the sections axially apart in said increased diameter condition of the locking structure while permitting axial separation of the sections in said reduced diameter condition of the locking structure;
   a retaining member which is receivable in a locking position within said interruption in a relation holding said locking structure in said increased diameter condition, and is displaceable from said locking position to enable constriction of the structure to said reduced diameter condition and thereby permit separation of the sections;
   a releasing unit lowerable into said sections; and
   means carried by one of said sections positioned for actuation by said unit to displace said retaining member from said locking position and thereby release the sections for separation.

4. A joint comprising:
   a tubular box section;
   a pin section adapted to project into said box section;
   a locking structure which is generally annular but has an interruption and is adapted to be expanded from a reduced diameter condition to an increased diameter condition;
   said sections having means coacting with said locking structure to block relative movement of the sections axially apart in said increased diameter condition of the locking structure while permitting axial separation of the sections in said reduced diameter condition of the locking structure;
   a retaining member which is receivable in a locking position within said interruption in a relation holding said locking structure in said increased diameter condition, and is displaceable from said locking position to enable constriction of the structure to said reduced diameter condition and thereby permit separation of the sections;
   a releasing unit lowerable into said sections; and
   at least one ejector part mounted within an opening in a side wall of said pin section for radial movement and which is engageable by said unit in a relation displacing said ejector part radially outwardly, and which ejector part acts when displaced radially outwardly to force said retaining member outwardly from said locking position and thereby enable separation of the sections.

5. A joint comprising:
   a tubular box section;
   a pin section adapted to project into said box section;

a locking structure which is generally annular but has an interruption and is adapted to be expanded from a reduced diameter condition in which said sections are axially separable to an increased diameter condition in which said locking structure is positioned to block relative movement of the sections axially apart;

a retaining member which is receivable in a locking position within said interruption in a relation holding said locking structure in said increased diameter condition, and is displaceable from said locking position to enable constriction of the structure to said reduced diameter condition and thereby permit separation of the sections;

said generally annular locking structure being carried within an essentially annular recess formed in the outer surface of said pin section and having at least one shoulder engageable with a coacting shoulder formed within said box section in said increased diameter condition of the locking structure to retain the sections against separation;

fluid actuated means carried by said pin section at the radially inner side of said locking structure and operable by pressure fluid to expand said locking structure to said increased diameter condition;

said box section having an opening through which said retaining member is insertible into said interruption in the locking structure and removable from said interruption;

fastener means for detachably securing said retaining member to said pin section within said interruption;

a releasing unit lowerable into said sections; and means operable by said releasing unit to eject said retaining member from said interruption to enable separation of the sections.

6. A joint as recited in claim 5, in which said last mentioned means include ejector parts mounted within openings in said pin section and positioned for actuation radially outwardly by said releasing unit to engage said retaining member and force it radially outwardly from within said interruption.

7. The method that comprises:
securing together a box section and a pin section projecting thereinto by applying the force of pressurized fluid radially outwardly against a generally annular circularly discontinuous locking structure and thereby expanding said locking structure from a reduced diameter condition in which the sections are free for separation to an increased diameter condition in which said locking structure coacts with said sections to block relative movment of the sections axially apart, and then holding said locking structure in said increased diameter condition by positioning a retaining member in a locking position within an interruption in the structure; and subsequently effecting removal of said retaining member from said locking position to release the locking structure for constriction to said reduced diameter condition and thereby enable separation of said sections.

8. The method that comprises:
securing together a box section and a pin section projecting thereinto by expanding a generally annular circularly discontinuous locking structure from a reduced diameter condition in which the sections are free for separation to an increased diameter condition in which said locking structure coacts with said sections to block relative movement of the sections axially apart, and then holding said locking structure in said increased diameter condition by positioning a retaining member in a locking position within an interruption in the structure;

subsequently effecting removal of said retaining member from said locking position to release the locking structure for constriction to said reduced diameter condition and thereby enable separation of said sections;

providing a connection detachably securing said retaining member to said pin section when the retaining member is within said interruption in the locking structure; and breaking said connection to enable movement of the retaining member from said locking position.

9. The method as recited in claim 8, in which said retaining member is moved from said locking position by lowering a releasing unit into said sections, and utilizing said unit to displace said retaining member from said locking position.

10. The method that comprises:
securing together a box section and a pin section projecting thereinto by expanding a generally annular circularly discontinuous locking structure from a reduced diameter condition in which the sections are free for separation to an increased diameter condition in which said locking structure coacts with said sections to block relative movement of the sections axially apart, and then holding said locking structure in said increased diameter condition by positioning a retaining member in a locking position within an interruption in the structure; and subsequently effecting removal of said retaining member from said locking position to release the locking structure for constriction to said reduced diameter condition and thereby enable separation of said sections;

said pin section carrying ejecting means for displacing said retaining member from said locking position;

said removal of the retaining member from said locking position being effected by lowering into said sections a releasing unit, and actuating said ejecting means by said releasing unit to displace the retaining member from said locking position.

11. The method that comprises:
securing together a box section and a pin section projecting thereinto by expanding a generally annular circularly discontinuous locking structure from a reduced diameter condition in which the sections are free for separation to an increased diameter condition in which said locking structure coacts with said sections to prevent axial separation of the sections, and then holding said locking structure in said increased diameter condition by positioning a retaining member in a locking position within an interruption in the structure when said sections are at an upper level;

advancing said sections downwardly to a lower remote level after said sections have been secured together; and then effecting displacement of said retaining member from said locking position remotely from said upper level while the sections are at said lower level to release the locking structure for constriction to said reduced diameter condition and thereby enable separation of said sections.

12. The combination comprising:
a tubular box section;
a pin section adapted to project into said box section;
remotely releasable locking means retaining said sections against axial separation and including an element adapted to be displaced laterally outwardly relative to said sections by a releasing tool lowered into said sections from a remote location thereabove, said locking means being constructed to release said sections for separation from one another upon said outward movement of said element;
said remotely releasable locking means including a locking ring carried by said pin section and having a shoulder engageable with said box section to lock the sections against axial separation;
said element being receivable within an interruption in said locking ring and displaceable laterally outwardly from said interruption to release the ring for constriction to a position enabling separation of the sections;
fastener means for releasably holding said element within said interruption in the locking ring; and
at least one ejector part movably carried by said pin section and having a portion projecting inwardly into a bore in the interior of the pin section and adapted to be engaged and displaced outwardly by said releasing tool;
said ejector part being located to force said element laterally outwardly from within said interruption in the locking ring.

13. The combination comprising:
a tubular box section;
a pin section adapted to project into said box section;
a releasing tool adapted to be lowered into said sections from a remote location thereabove;
remotely releasable locking means retaining said sections against axial separation and including an element adapted to be displaced laterally outwardly relative to said sections by said releasing tool when lowered into said sections;
said locking means being constructed to release said sections for separation from one another upon said outward movement of said element;
said locking means including a locking ring having an interruption within which said element is received to hold said ring in a position retaining the sections against axial separation, and
at least one ejector part movably carried by said pin section and having a portion projecting inwardly into a bore within the interior of the pin section and engageable by and displaceable laterally outwardly by said releasing tool,
said ejector part being located to displace said element laterally outwardly from within said interruption when the ejector part is engaged and displaced outwardly by the releasing tool.

14. The method that comprises:
retaining together a tubular box section and a pin section projecting thereinto by remotely releasable locking means which include a locking ring and an element received in a locking position within an interruption in said ring to hold the ring in an expanded locking condition blocking axial separation of the sections;
lowering a releasing tool into said sections;
displacing said element by said releasing tool relative to said sections and from said locking position; and
thereby enabling constriction of the ring from said expanded locking condition to a released condition permitting axial separation of the sections.

15. The method as recited in claim 14, including holding said element in said active locking position by a frangible connection, and breaking said frangible connection when said element is displaced from said active position by said releasing tool.

16. The method that comprises:
retaining together a tubular box section and a pin section projecting thereinto by remotely releasable locking means;
lowering a releasing tool into said sections;
said locking means including a locking member held by a retaining element in an active locking position retaining the sections aganst separation, and a fastener attaching said element to said pin section at an active location holding said locking member in locking position;
displacing an ejector part, which is movably carried by said pin section and projects into the interior thereof, laterally outwardly by said releasing tool; and
actuating said retaining element laterally outwardly by said ejector part in a relation causing said fastener to fail and thereby displacing said locking member from said locking position and releasing said sections for axial separation.

17. The combination comprising:
a tubular box section;
a pin section adapted to project into said box section; and
locking means for releasably retaining said sections against separation;
said locking means including an element operable to release said locking means by movement of said element from a first position thereof to a second position thereof, a frangible connection for retaining said element in said first position, and means for breaking said frangible connection and causing movement of said element from said first position to said second position to release said sections for separation;
said frangible connection comprising a fastener detachably securing said element to said pin section and adapted to be broken by laterally outward displacement of said element.

18. The combination as recited in claim 17, including at least one ejector part movably carried by said pin section at the radially inner side of said element and projecting into the interior of said pin section and adapted to be engaged by a releasing unit lowered into said sections and be forced radially outwardly thereby to displace said element from said first position to said second position breaking said frangible connection.

19. The combination as recited in claim 17, in which said means for breaking said frangible connection include a releasing element to be lowered into said sections and adapted to break said frangible connection.

20. The method that comprises:
securing together a tubular box section and a pin section projecting thereinto by locking means including an element displaceable between a first position in which said locking means coact with said sections to block relative movement of said sections axially apart and a second position releasing the sections for separation, and a frangible connection including a fastener securing said element to said pin section and holding said element in said first position;

lowering a releasing tool into said sections; and forcing said element laterally outwardly by said releasing tool from said first position to said second position and thereby breaking said fastener and releasing said sections for separation.

21. The combination comprising:
a tubular box section;
a pin section adapted to project into said box section and to be lowered therewith to a remote location;
a locking structure which is generally annular but has an interruption and is adapted to be expanded from a reduced diameter condition to an increased diameter condition;
said sections having means coacting with said locking structure to block relative movement of the sections axially apart in said increased diameter condition of the locking structure while permitting axial separation of the sections in said reduced diameter condition of the locking structure;
a retaining member which is receivable in a locking position within said interruption in a relation holding said locking structure in said increased diameter condition, and displaceable from said locking position to enable constriction of the structure to said reduced diameter condition and thereby permit separation of the sections; and
means operable remotely from a location above the level of said sections to effect displacement of said retaining member from said locking position and permit separation of the sections.

22. The combination as recited in claim 21, including means operable by pressure fluid to expand said locking structure from said reduced diameter condition to said increased diameter condition.

23. The combination as recited in claim 21, including means for detachably securing said retaining member to said pin section within said interruption in said locking structure.

24. The combination as recited in claim 21, in which said retaining member is a block receivable at the outside of said pin section within said interruption in the locking structure, there being a threaded fastener extending through said block and connected to said pin section to secure the block thereto.

25. The combination as recited in claim 21, in which said last mentioned means include a releasing unit lowerable into said sections and operable to effect displacement of said retaining member from said locking position.

26. The combination as recited in claim 21, in which said last mentioned means include an element having a portion projecting radially inwardly into an inner bore in said pin section and adapted upon outward movement to displace said retaining member from said locking position, and a releasing unit lowerable into said sections and adapted to displace said element outwardly.

27. A joint comprising:
a tubular box section;
a pin section adapted to project into said box section;
a locking structure which is generally annular but has an interruption and is adapted to be expanded from a reduced diameter condition to an increased diameter condition;
said sections having means coacting with said locking structure to block relative movement of the sections axially apart in said increased diameter condition of the locking structure while permitting axial separation of the sections in said reduced diameter condition of the locking structure;
a retaining member which is receivable in a locking position within said interruption in a relation holding said locking structure in said increased diameter condition, and is displaceable from said locking position to enable constriction of the structure of said reduced diameter condition and thereby permit separation of the sections;
said locking structure being resilient and adapted when released by said retaining member to constrict by its own resilience to said reduced diameter condition and to an extent enabling separation of the sections without further constriction of the locking structure; and
means for expanding said locking structure from said reduced diameter condition to which it returns resiliently to said increased diameter condition.

28. A joint comprising:
a tubular box section;
a pin section adapted to project into said box section;
a locking structure which is generally annular but has an interruption and is adapted to be expanded from a reduced diameter condition to an increased diameter condition;
said sections having means coacting with said locking structure to block relative movement of the sections axially apart in said increased diameter condition of the locking structure while permitting axial separation of the sections in said reduced diameter condition of the locking structure;
a retaining member which is receivable in a locking position within said interruption in a relation holding said locking structure in said increased diameter condition, and is displaceable from said locking position to enable constriction of the structure to said reduced diameter condition and thereby permit separation of the sections;
said locking structure being resilient and adapted when released by said retaining member to constrict by its own resilience to said reduced diameter condition and to an extent enabling separation of the sections without further constriction of the locking structure; and
means operable remotely from a location above the level of said joint to effect displacement of said retaining member from said locking position.

* * * * *